Sept. 17, 1957           J. AUGER           2,806,392

DEVICE FOR APPLYING ANTI-SKID CHAINS

Filed April 26, 1955

INVENTOR
JACQUES AUGER
BY
ATTORNEY

United States Patent Office 2,806,392
Patented Sept. 17, 1957

2,806,392

DEVICE FOR APPLYING ANTI-SKID CHAINS

Jacques Auger, Lachine, Quebec, Canada

Application April 26, 1955, Serial No. 503,930

1 Claim. (Cl. 81—3)

This invention relates to motor vehicle anti-skid chains.

More particularly, the invention relates to a hook device for attaching the opposite ends of a side chain of anti-skid chains, and to a tool for applying the end link of such chain to the hook device.

As is well known, anti-skid chains are difficult to apply. It is particularly so of continuous or "long chains," that is, chains which include two side chains and spaced transverse short chains. In the case of such chains, it is almost necessary to jack up each wheel before the chain may be applied. The modern models of automobiles particularly render the application of such a chain an arduous and difficult task, even if the wheel is jacked up.

A chain hook device and tool according to this invention, make the task of attaching the opposite ends of a side chain considerably easier.

An object of the invention is to provide a novel hook device for attaching the opposite ends of a side chain of anti-skid chains.

Another object of the invention is to provide a novel tool for attaching the novel hook device aforesaid to the end link of a side chain.

In the drawing wherein like numerals of reference indicate corresponding parts in the various figures, Figure 1 is a fragmentary side view of an anti-skid chain, showing the inside side chain equipped with a hook device made in accordance with the present invention, and the tool for operating the device (this view would be that seen when looking toward the inside face of the tire);

Figure 1:
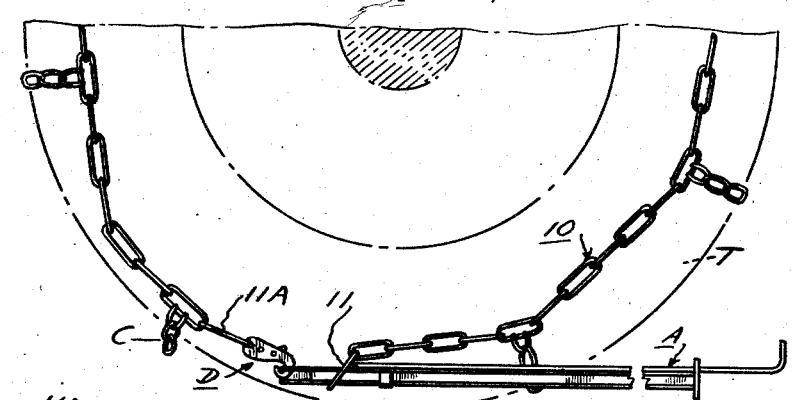

Referring now by numerals to the drawing, 10 shows one of the side or longitudinal chains, namely the inside chain, that is, the side chain which engages the inner face of the wall of the tire T. In includes a number of the usual interconnecting links of conventional design, such as are usual in conventional chains, to provide a length of chain terminating at its opposite ends with links 11 and 11A. The opposite ends of the chain length (which includes the links 11 and 11A) are releasably attached by a novel hook device D, the whole forming the inside chain 10. Between the side chain 10, and its complementary (opposite side) chain (not shown) which engages the outer face of the tire T, are the usual transverse chains C.

Figure 4:
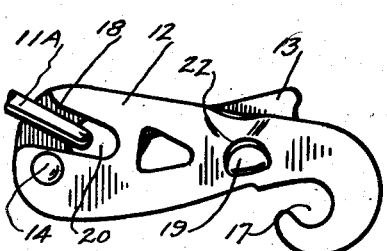
Figure 4 is a side view of the hook device, in a position ready to receive a chain link.
Figure 5:
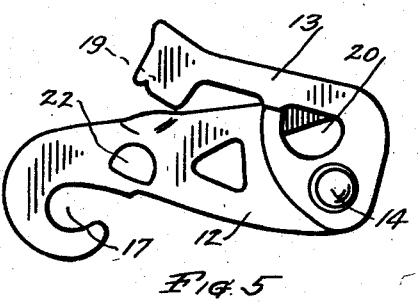
Figure 5 is a view of Figure 4, looking from rear to front, the device being shown in another position; and, Figure 6 is a top plan view of Figure 4.
Figure 6:
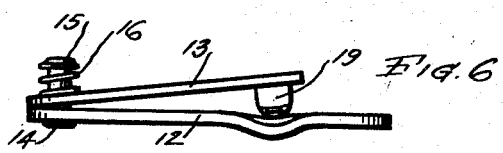

The attaching hook device D comprises two substantially flat members 12 and 13 pivotally connected as at and by a pin 14, adjacent one end of the members. Disposed between the head 15 formed on one end of the pin 14 and the member 13, is a spring 16 resiliently urging the member 13 against the member 12. The member 13, adjacent the pin 14, is formed with an aperture 20 permanently to connect one end of the device D to the link 11A. The end of the member 12, remote from the pin 14, is hook-shaped as at 17; the hook is adapted to receive and retain the link 11 when the device is in inoperative or open position. Opposite the hook-shaped end 17, and adjacent the pin 14, there is formed in the member 12, a U-shaped notch 18 which registers with the aperture 20 in the member 13 when the device is in closed or operated position. The end of the member 13, remote from the pin 14, is formed with an extension which is bent back as at 19, to define a hook which is adapted to engage an edge (the lower edge, as seen in Figure 4) of the member 12 when the hook is in closed or operated position, thus closing the hook 17, and retaining the link 11 attached to the hook device.

The hook thus far described is a conventional and well-known one. Such hook has the disadvantage that it is not securely held in a position ready to receive the link 11, such as the position shown in Figure 4. On the other hand, a hook device improved in accordance with the invention, is such that it is held securely in "ready" position, until the hook device has to be completely closed to operated position, with the lug 19 engaging the lower edge of the member 12.

The improvement consists in providing a slot 22 through the member 12 adapted to receive the lug 19 and therefore, resiliently retain the two members 12 and 13 in their ready, link-receiving position. This lug and slot arrangement thus acts as a detent.

The link 11 may be attached to the hook device D, more particularly to the hook portion 17, by a tool of the present invention, shown as A.

The tool comprises two elongate, straight members 25 and 26, relatively movable longitudinally. The member 25 may take the form of a flat bar, and the member 26, that of a channel. The two members are relatively movable longitudinally as by providing an inverted U-shaped bracket 27 welded to, and depending from the member 25, adjacent one end (the forward end) thereof, and a transverse plate 28 welded to the opposite end (the rear end) of the member 26 and formed with a transverse rectangular slot (not shown) in which the member 25 is slidably received. The plate 28, which extends laterally on both sides of the member 26, as best seen in Figure 3, and below the member 26, as best seen in Figure 2, serves to hold the tool in position on the ground, with the member 25 lying uppermost.

Figure 2:
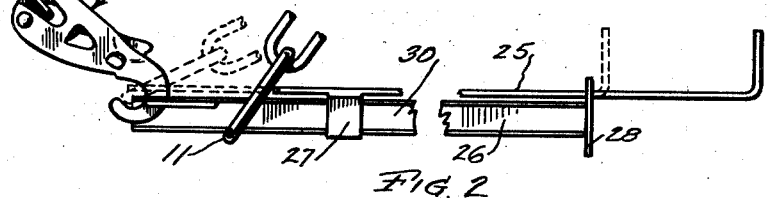
Figure 2 is a fragmentary view of Figure 1, on an enlarged scale.
Figure 3:
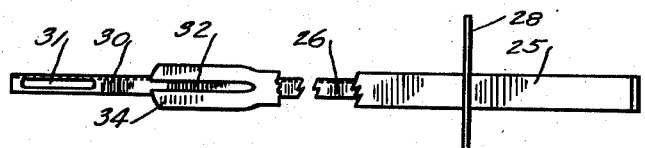
Figure 3 is a top plan view of Figure 2, parts omitted.

One flange 30 (the upper flange, as seen in Figure 2) of the channel member 26 is formed, adjacent its forward end, with a longitudinal slot 31, adapted to receive the hook portion 17 of the hook device D, as best seen in Figure 2. The forward end of the member 25 is formed with a longitudinal recess 32 defining two fingers 34. The recess is adapted to receive the hook portion 17 of the hook device D, and the ends of the fingers to engage the link 11, as when the tool is operated by moving the member 25 relatively to the member 26, to shift the link 11 toward the hook and to attach or "hook" the link to the hook device.

Operation

The chain C is draped over the tire T as is the usual practice. The opposite end links of the outside chain may be attached by a conventional hook.

If desired, both side and outside chains may be attached by a hook device D according to the invention.

As the ends of the chain hang, the tool, in its extended position, is manipulated first to insert the end of the member 26 through the link 11, and the tool bodily moved forwardly to attach the member 26 to the hook device D, as seen in Figure 2. The tool is next effectively shortened, as by moving the member 25 forwardly on the member 26. The ends of the fingers 34 engage the link 11 and the link is shifted on the member 26 into the hook portion 17, that is, to the position shown in dot and dash in Figure 2.

To remove or disengage the tool, more particularly to disengage the member 26 from the hook, the member 25 is retracted slightly, and the member 26 bodily moved forwardly.

The members 12 and 13 of the hook device D are now relatively rotated manually so that the device assumes its operated position, with the lug 19 engaging the lower edge of the member 12.

What I claim is:

For use in attaching an end link of a side chain of an anti-skid tire chain to a hook forming the opposite end of the chain; a tool comprising a first substantially elongate member, an elongate slot through said member adjacent one end thereof adapted to receive the hook removably to attach the hook thereto, a second substantially straight elongate member, co-operating slide bearing for securing said members for relative longitudinal displacement, said second member having at one end a pair of fingers adapted to be engaged by the link to limit the displacement of the link on said first member away from said slot, said second member being displaceable on said first member toward said slot to shift the link into engagement with the hook.

References Cited in the file of this patent

UNITED STATES PATENTS

| | | |
|---|---|---|
| 1,255,546 | Maxson et al. | Feb. 5, 1918 |
| 1,383,898 | Ziemendorf | July 5, 1921 |
| 1,437,158 | Snodgrass | Nov. 28, 1922 |
| 1,539,221 | Tennant | May 26, 1925 |
| 1,744,356 | Bodendieck | Jan. 21, 1930 |
| 1,816,230 | Reyburn | July 28, 1931 |
| 2,157,687 | Briggs | May 9, 1939 |